US009941923B2

(12) United States Patent
Esmaeilzadeh Najari et al.

(10) Patent No.: US 9,941,923 B2
(45) Date of Patent: Apr. 10, 2018

(54) RADIO TRANSCEIVER CIRCUIT

(71) Applicant: Catena Holding B.V., Delft (NL)

(72) Inventors: Omid Esmaeilzadeh Najari, Stockholm (SE); Mats Lennart Carlsson, Sundbyberg (SE)

(73) Assignee: Cantena Holding B.V. (NL)

( * ) Notice: Subject to any disclaimer, the term of this patent is extended or adjusted under 35 U.S.C. 154(b) by 0 days.

(21) Appl. No.: 15/260,828

(22) Filed: Sep. 9, 2016

(65) Prior Publication Data
US 2017/0077984 A1 Mar. 16, 2017

(30) Foreign Application Priority Data

Sep. 11, 2015 (EP) .................................. 15184884
Oct. 6, 2015 (EP) .................................. 15188612

(51) Int. Cl.
*H04B 1/44* (2006.01)
*H04B 1/48* (2006.01)
*H04B 1/00* (2006.01)
*H04B 1/525* (2015.01)
*H04W 4/00* (2018.01)
*H04W 84/12* (2009.01)

(52) U.S. Cl.
CPC ............... *H04B 1/48* (2013.01); *H04B 1/006* (2013.01); *H04B 1/525* (2013.01); *H04W 4/008* (2013.01); *H04W 84/12* (2013.01)

(58) Field of Classification Search
CPC .......... H04B 1/48; H04B 1/006; H04B 1/525; H04W 4/008; H04W 84/12
See application file for complete search history.

(56) References Cited

U.S. PATENT DOCUMENTS

| 5,054,114 A * | 10/1991 | Erickson | .................. H04B 1/48 333/101 |
| 2009/0036065 A1 * | 2/2009 | Siu | .................. H03F 1/223 455/78 |
| 2014/0199951 A1 * | 7/2014 | Yu | .................. H04B 1/44 455/83 |

(Continued)

OTHER PUBLICATIONS

Winoto, Renaldi, et al. "A WLAN and bluetooth combo transceiver with integrated WLAN power amplifier, transmit-receive switch and WLAN/bluetooth shared low noise amplifier." 2012 IEEE Radio Frequency Integrated Circuits Symposium. IEEE, 2012.

(Continued)

*Primary Examiner* — Nguyen Vo
(74) *Attorney, Agent, or Firm* — Crawford Maunu PLLC

(57) ABSTRACT

The disclosure relates to transceivers incorporating a transmit-receive switching circuit, embodiments of which include a radio transceiver circuit comprising: a first amplifier for amplifying signals received from an antenna via an antenna connection; a second amplifier for amplifying signals to be transmitted by the antenna via the antenna connection; and a switching circuit connected between an input of the first amplifier and the antenna connection, the switching circuit comprising a capacitor, a switching element and an impedance matching element, wherein the switching element is configured to connect a node between the capacitor and the impedance matching element to a signal ground when the transceiver is in a transmit mode.

19 Claims, 8 Drawing Sheets

(56) References Cited

U.S. PATENT DOCUMENTS

| 2014/0206301 A1 | 7/2014 | Geddada et al. |
| 2015/0094117 A1 | 4/2015 | Conta et al. |
| 2016/0036390 A1* | 2/2016 | Lin ..................... H03F 1/0277 455/90.2 |

OTHER PUBLICATIONS

Kumar, Rakesh, et al. "A fully integrated 2× 2 b/g and 1× 2 a-band MIMO WLAN SoC in 45nm CMOS for multi-radio IC," 2013 IEEE International Solid-State Circuits Conference Digest of Technical Papers. IEEE, 2013.

Wu, Chia-Hsin, et al. "A 60nm WiFi/BT/GPS/FM combo connectivity SOC with integrated power amplifiers, virtual SP3T switch, and merged WiFi-BT transceiver." 2013 IEEE Radio Frequency Integrated Circuits Symposium (RFIC). IEEE, 2013.

Extended European Search Report for EP Patent Application No. 15188612.4 (Mar. 23, 2016).

* cited by examiner

… (1)

RADIO TRANSCEIVER CIRCUIT

CROSS-REFERENCE TO RELATED APPLICATIONS

This application claims the priority under 35 U.S.C. § 119 of European patent application nos. 15184884.3 (filed on Sep. 11, 2015) and 15188612.4 (filed on Oct. 6, 2015), the contents of which are incorporated herein by reference.

FIELD

The disclosure relates to radio transceivers incorporating a transmit-receive switching circuit.

BACKGROUND

Transmit-receive (Tx-Rx) switches are typically designed for frequency ranges up to around 2.5 GHz, for example when a switch is integrated on an ASIC. Discrete switches may be used at higher frequencies. An example from reference [1] of an integrated switch is illustrated in FIG. 1, which shows a transceiver 100 having a power amplifier (PA) 101 and a low noise amplifier (LNA) 102, both of which are connected to an antenna 103. The PA 101 is connected to the antenna 103 via a transformer 104 and a transmit (Tx) switch 105. A further transmit switch 106 is provided between an input of the LNA 102 and ground. When the Tx switches 105, 106 are activated, the output of the PA 101 is fed to the antenna 103 and the input of the LNA is grounded.

FIGS. 2 and 3 illustrate another approach from references [2] and [3], in which Tx-Rx switches employ two or more transformers (baluns), which may be integrated or provided as off-chip components. In the transceiver 200 illustrated in FIG. 2, the PA 201 and LNA 202 are switched using an external balun 203, while in the transceiver 300 illustrated in FIG. 3 the PA 301 and LNA 302 are switched using an internal impedance matching circuit 303.

In the first type of transceiver 100, i.e. that of FIG. 1, the series switch 105 between the PA 101 and the antenna 103 will tend to result in output power loss. In addition, the parasitic capacitance of the switch 105 will tend to limit the working frequency range of the transceiver 100. In the second approach, i.e. that of either FIG. 2 or FIG. 3, employing two or more transformers is considerably more expensive, especially in the case of using an off-chip transformer (in the FIG. 2 arrangement). In addition to manufacturing cost, designing two transformers for wideband applications is very difficult, which will tend to limit the use of this type of arrangement to narrowband applications.

SUMMARY

In accordance with the present disclosure there is provided a radio transceiver circuit comprising:
- a first amplifier for amplifying signals received from an antenna via an antenna connection;
- a second amplifier for amplifying signals to be transmitted by the antenna via the antenna connection; and
- a switching circuit connected between an input of the first amplifier and the antenna connection, the switching circuit comprising a capacitor, a switching element and an impedance matching element,
- wherein the switching element is configured to connect a node between the capacitor and the impedance matching element to a signal ground when the transceiver is in a transmit mode.

The switching arrangement for the transceiver allows for impedance matching for both the first and second amplifiers, i.e. the LNA and PA, and protects the input of the LNA from large swings at the output of the transmitter. This makes it possible to realize competitive performance for lower cost and provides functionality over a wide frequency range.

The radio transceiver circuit may comprise a transformer connected between an output of the second amplifier and the antenna connection. In alternative embodiments the transformer may be omitted, for example where the second amplifier is single ended, in which case an inductor may be provided between the output of the second amplifier and the antenna connection.

If present, the transformer connecting the second amplifier to the antenna connection may be a balance to unbalance transformer, commonly termed a balun.

The impedance matching element may be an inductor.

The radio transceiver circuit may also comprise a bond wire inductance connected between the switching circuit and the antenna connection.

In an example embodiment the switching element is a transistor connected between the impedance matching element and the signal ground to provide a short therebetween when activated.

The impedance matching element may be arranged to transform an input impedance of the first amplifier to an impedance looking into the impedance matching element from the node that is a complex conjugate of an impedance looking into the capacitor from the node.

The second amplifier may be operable to amplify signals to be transmitted according to a first wireless communications standard, and the transceiver may further comprise a third amplifier operable to amplify signals to be transmitted according to a second different wireless communications standard by the antenna via the antenna connection.

An output of the third amplifier may be connected between the impedance matching element and the input of the first receiving amplifier.

The transceiver may further comprise a fourth amplifier operable to amplify signals to be transmitted according to the second wireless communications standard by the antenna via the antenna connection, wherein an output of the fourth amplifier is connected to a node between the impedance matching element and the capacitor.

The fourth amplifier may be a switching power amplifier comprising first and second transistors, the first transistor connected between the node and signal ground to provide a short therebetween when activated.

The radio transceiver circuit may further comprise a fifth amplifier for amplifying signals received from the antenna via the antenna connection and a second impedance matching element connected between the node and an input of the fifth amplifier.

The second impedance matching element may transform an input impedance of the fifth amplifier to an impedance looking into the impedance matching element from the node that is a complex conjugate of an impedance looking into the capacitor from the node.

The first or second wireless communications standard may for example be a Bluetooth® standard or an IEEE 802.11x standard.

An integrated circuit may be provided comprising a radio transceiver circuit according to any of the above mentioned aspects.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
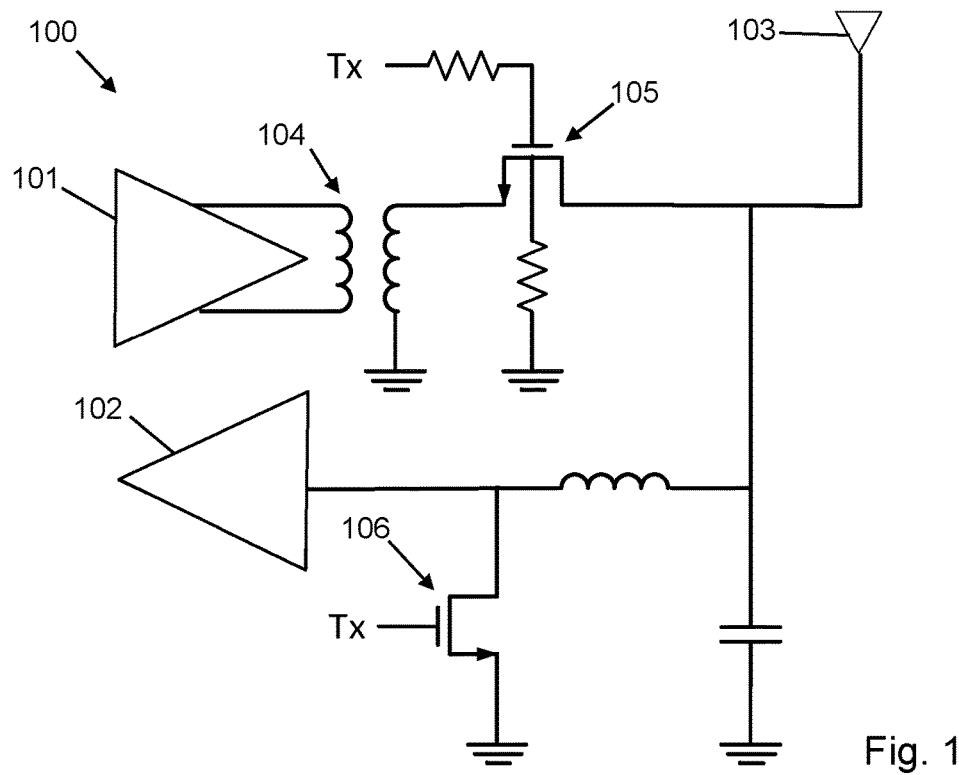
FIG. 1 illustrates an example of a transceiver with a transmit switching arrangement.
Figure 2:
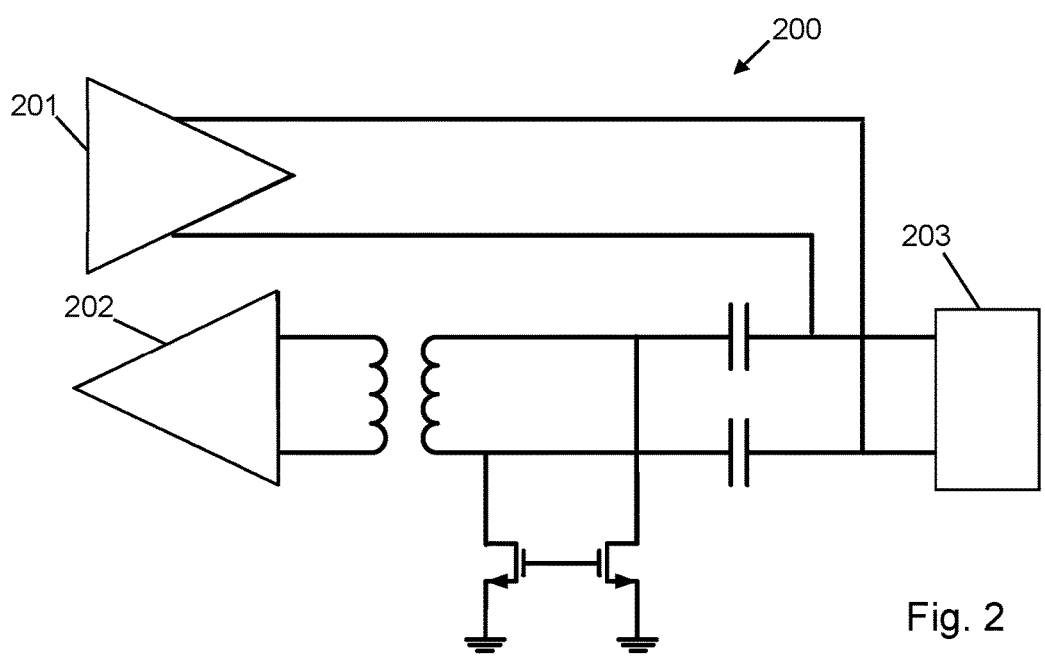
FIG. 2 illustrates an alternative example of a switchable transceiver.

It should be noted that the figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 4:
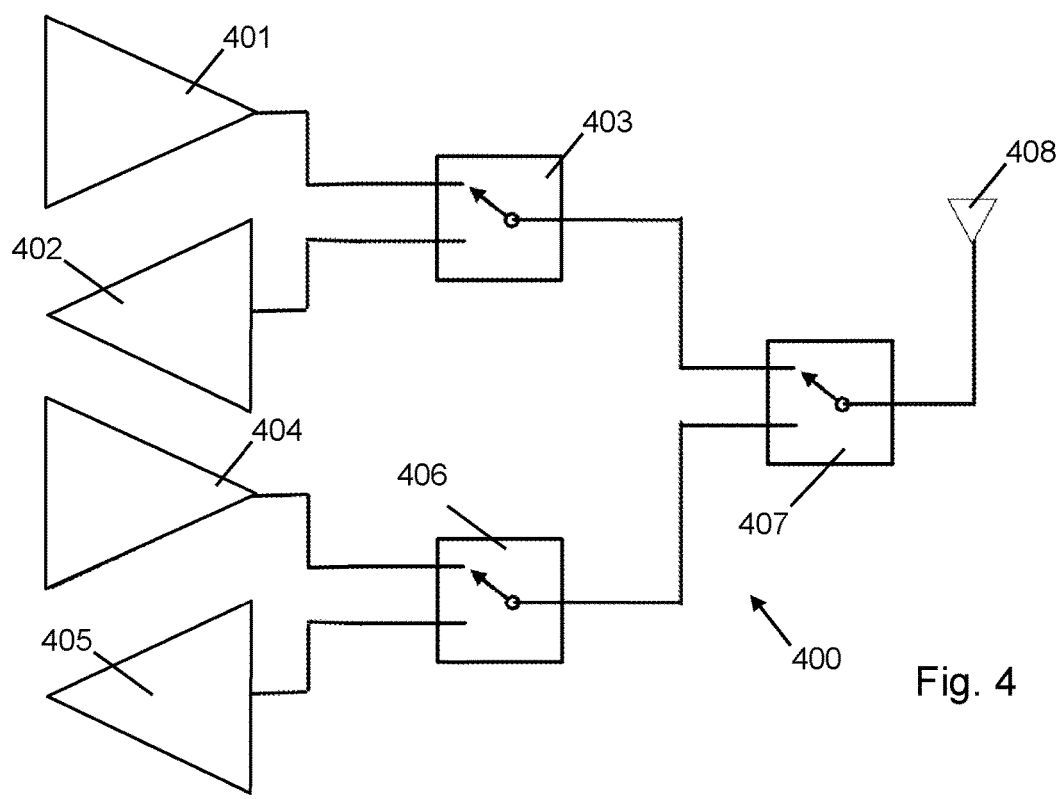
FIG. 4 illustrates an example of a multi-standard transceiver.

For some applications, a Tx-Rx switch may be needed that is operable with two or more wireless communications standards. For example, a switch may be required that can transmit and receive both Bluetooth® and IEEE 802.11x standard (WLAN) signals. An example from reference [1] of a multi-standard switch is illustrated in FIG. 4, which shows a multi-standard transceiver 400. Multi-standard transceiver 400 comprises a first branch with a first power amplifier 401 and first low noise amplifier 402 connected to a first external switch 403, and a second branch with a second power amplifier 404 and second low noise amplifier 405 connected to a second external switch 406. The first and second branches are operable with two different wireless communication standards. The external switches 403, 406 are used to selectively connect either the power amplifier or LNA of each branch to a third external switch 407. The external switch 407 selectively connects one of the branches to an antenna 408.

Figure 3:
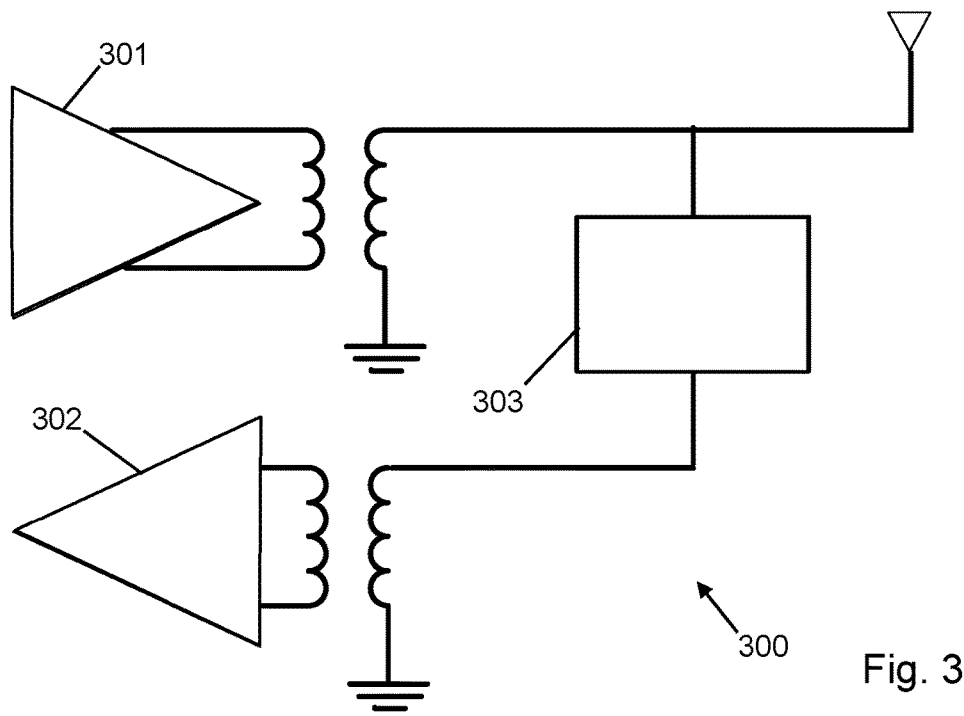
FIG. 3 illustrates a further alternative example of a switchable transceiver.
Figure 5:
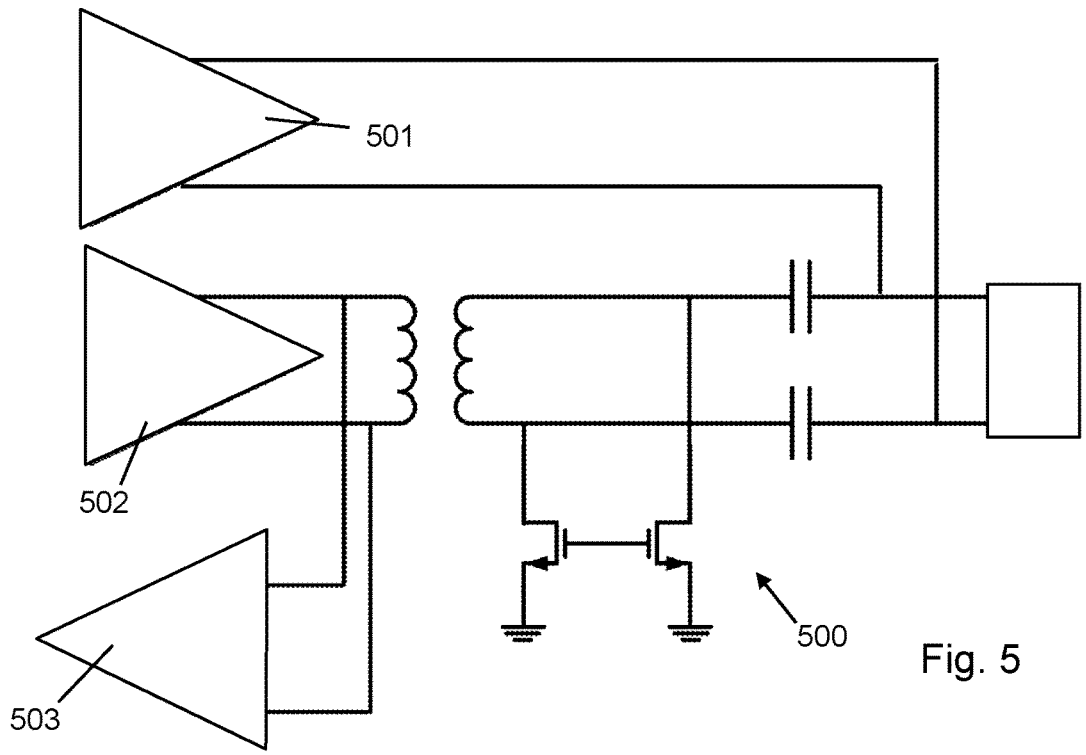
FIG. 5 illustrates an alternative example of a multi-standard transceiver.

FIG. 5 illustrates an alternative multi-standard transceiver 500 from reference [3], which is similar to transceiver 300 illustrated in FIG. 3. Transceiver 500 uses two power amplifiers 501, 502 operable according to two different wireless communication standards. A LNA 503 is shared between the two standards, and a virtual switch is integrated.

In the first type of multi-standard transceiver 400, the external switch components tend to increase the cost of the design. In the second approach of multi-standard transceiver 500, employing two transformers again adds to the expense of the circuit. In addition, the impedance seen by the amplifier 502 is dependent upon the design of LNA 503 and, similarly to transceiver 300, use of this type of arrangement tends to be limited to narrowband applications.

Figure 6:
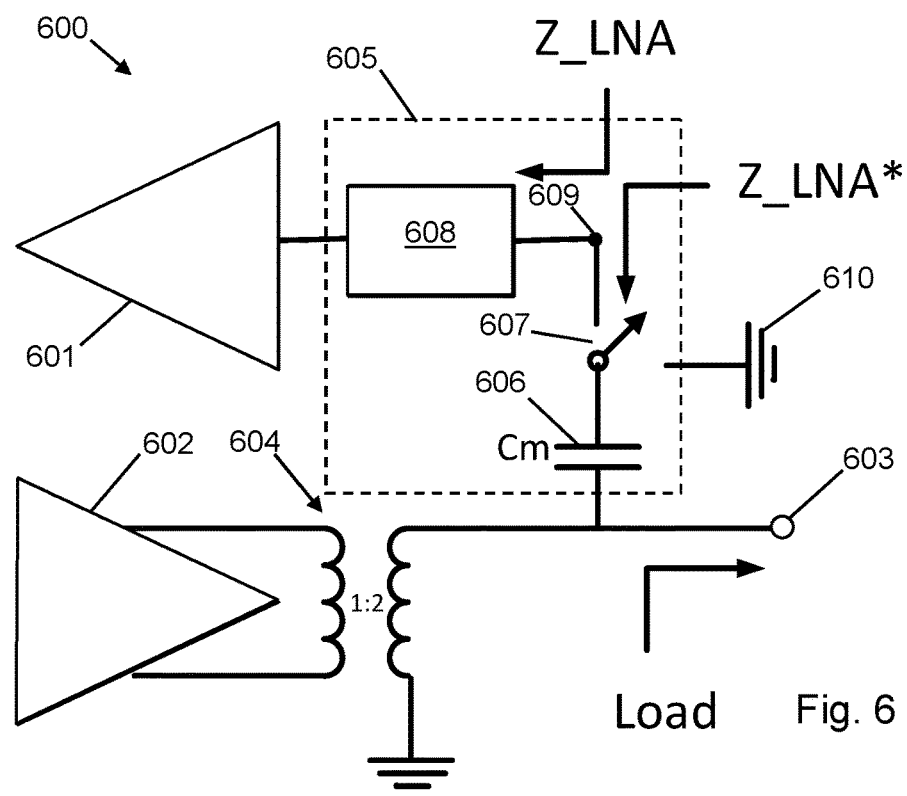
FIG. 6 illustrates an example embodiment of a transceiver with a switching arrangement.

FIG. 6 illustrates an example embodiment of a transceiver circuit 600 for radiofrequency (RF) applications comprising a Tx-Rx switching arrangement. The transceiver 600 comprises a first amplifier 601, i.e. an LNA, for amplifying signals received from an antenna (not shown) via an antenna connection 603, and a second amplifier 602, i.e. a PA, for amplifying signals to be transmitted by the antenna via the antenna connection 603. A transformer 604 is connected between an output of the PA 601 and the antenna connection 603. In this example, the transformer 604 is a balun that transforms a differential output of the PA to a single-ended output for the antenna load.

The transceiver circuit 600 further comprises a switching circuit 605 connected between an input of the LNA 601 and the antenna connection 603, the switching circuit 605 comprising a capacitor Cm 606, a switching element 607 and an impedance matching element 608.

The switching element 607 is configured to connect a node 609 between the capacitor 606 and the impedance matching element 608 to a signal ground 610 when the transceiver 600 is in a transmit mode.

The transceiver 600 provides impedance matching for both the LNA 601 and PA 602 and protects the input of the LNA 601 from large swings at the output of the transmitter. The design makes it possible to realize competitive performance for low cost and furthermore provides functionality over a wide frequency range.

The switching element 607 may be provided as a transistor working as a switch, which is arranged to short one of its terminals to ground 610 in transmit mode, thereby protecting the input of the LNA 601 from large swings at the transmitter output, i.e. at the antenna connection 603. The transistor makes the same terminal as open circuit during receive mode. The transformer 604 can be realized with an on-chip or external transformer, transforming the differential output of the PA 602 to a single-ended output. The transformer 604 also provides impedance transformation for the PA 602 to allow the PA 602 deliver high output powers to the load, i.e. an antenna connected to the antenna connection 603.

The capacitor Cm 606 serves to tune out the transformer 604 in transmit mode and works as a matching component in receive mode. The capacitor Cm 606 may be an integrated capacitor or an external capacitor. The impedance matching element 608 can be realized using on-chip integrated passive and active components or using external components providing input impedance matching for the LNA 601.

The impedance matching element 608 may be designed in such a way that it transforms the input impedance of the LNA 601, as viewed from the node 609, to an impedance Z_LNA, which is a complex conjugate of the impedance Z_LNA* as viewed from the node 609 looking into the capacitor Cm 606.

The design of the transceiver makes it possible to choose all the necessary components from integrated devices and components, which allows the overall cost of the transceiver to be reduced.

Figure 7:
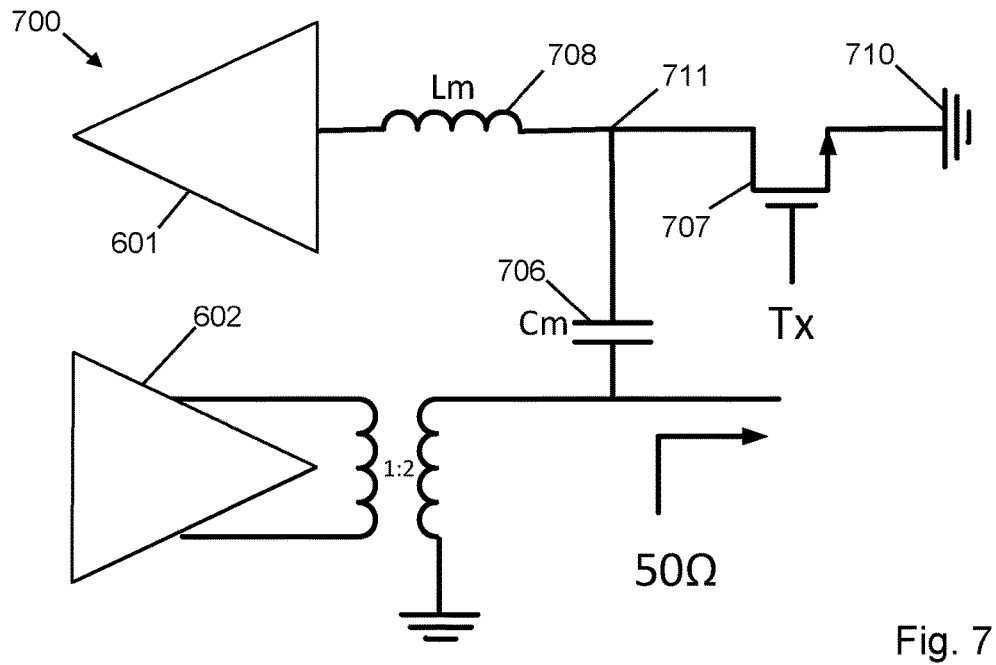
FIG. 7 illustrates an alternative example embodiment of a transceiver with a switching arrangement.

FIG. 7 illustrates one possible embodiment of a transceiver 700 using only integrated components. In this example, the impedance matching network is realized using an on-chip integrated inductor Lm 708. The switch is realized with a CMOS transistor 707 working as a low on-resistance switch. The switch is ON during transmit mode and grounds the connection 711 between the inductor Lm 708 and the capacitor Cm 706 to signal ground 710 when activated. During receive mode the transistor 707 is OFF.

Figure 8:
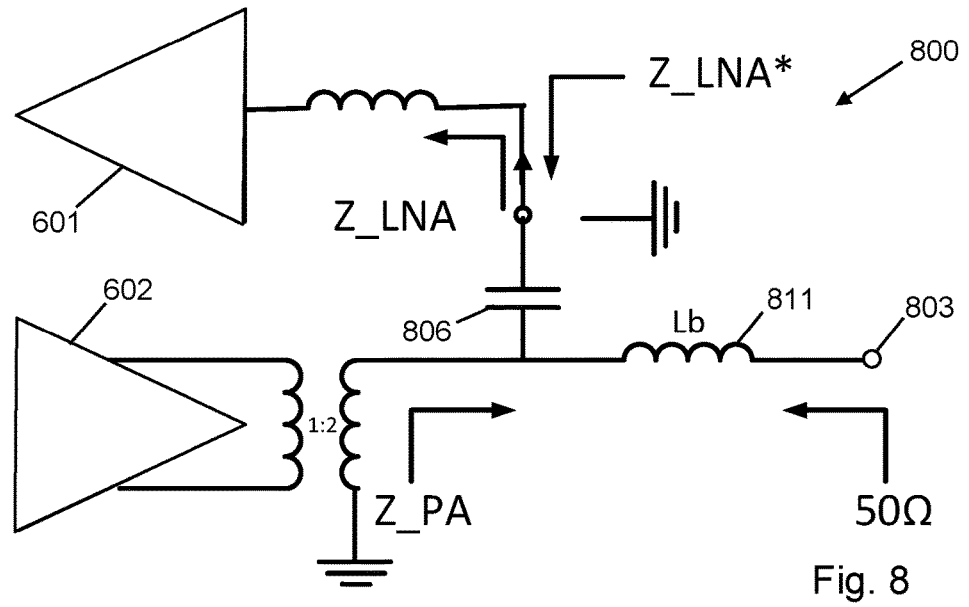
FIG. 8 illustrates a further alternative example embodiment of a transceiver with a switching arrangement.

FIG. 8 illustrates a further possible embodiment of a transceiver 800, using a bond wire inductance Lb 811 connected between the capacitor 806 and the antenna connection 803. In this example, only the values for Cm and Lm are different from the transceiver 700 shown in FIG. 7. In this example the LNA 601 is impedance matched to a 50Ω antenna and the load for the PA 602 is also a 50Ω antenna.

Figure 9:
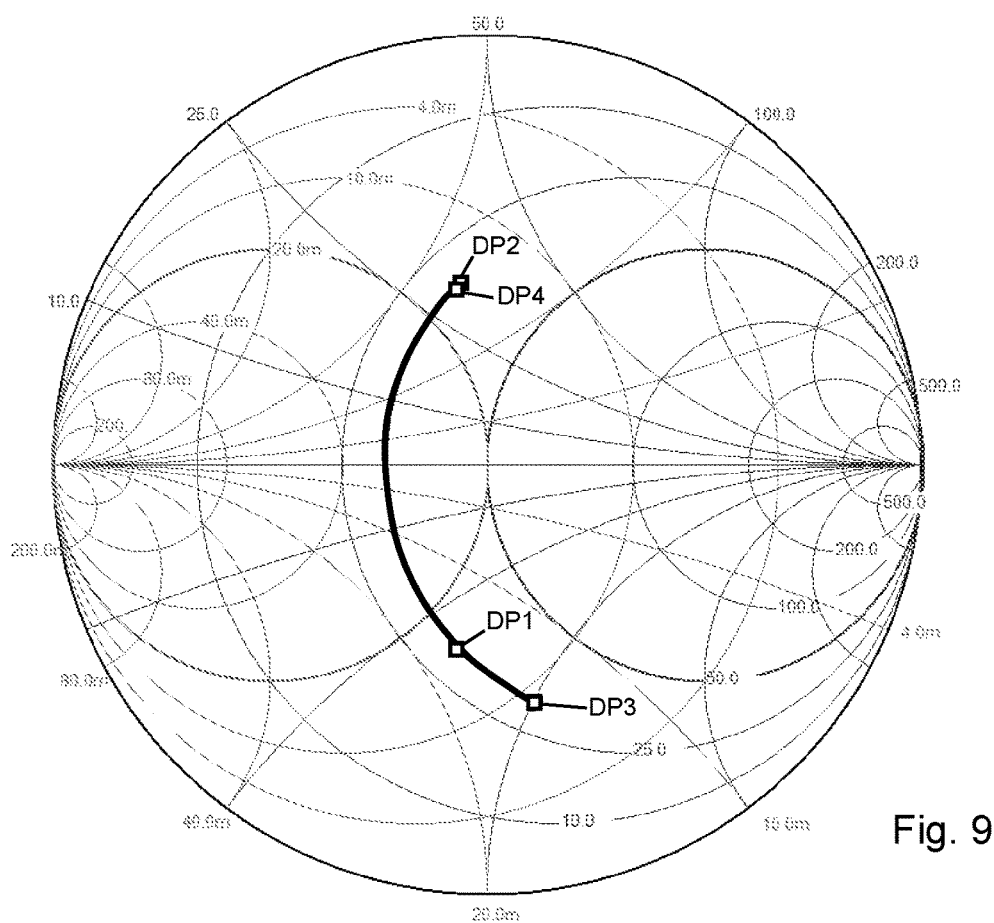
FIG. 9 is a diagram illustrating how the inductor Lm in the FIG. 5 embodiment matches the input impedance of the LNA.

FIG. 9 is a complex impedance polar plot (commonly known as a Smith chart), showing how the inductor Lm 708 in the arrangement of FIG. 7 matches the input impedance of the LNA 602. The point DP3 represents the input impedance of the LNA 601 and DP1 the impedance looking into capacitor Cm 706. Adding a series inductor Lm 708 to the input impedance of the LNA 601 transforms DP3 into DP2, which is the complex conjugate of impedance DP1. This technique and method may also be employed for differential LNAs and single-ended PAs.

Figure 10:
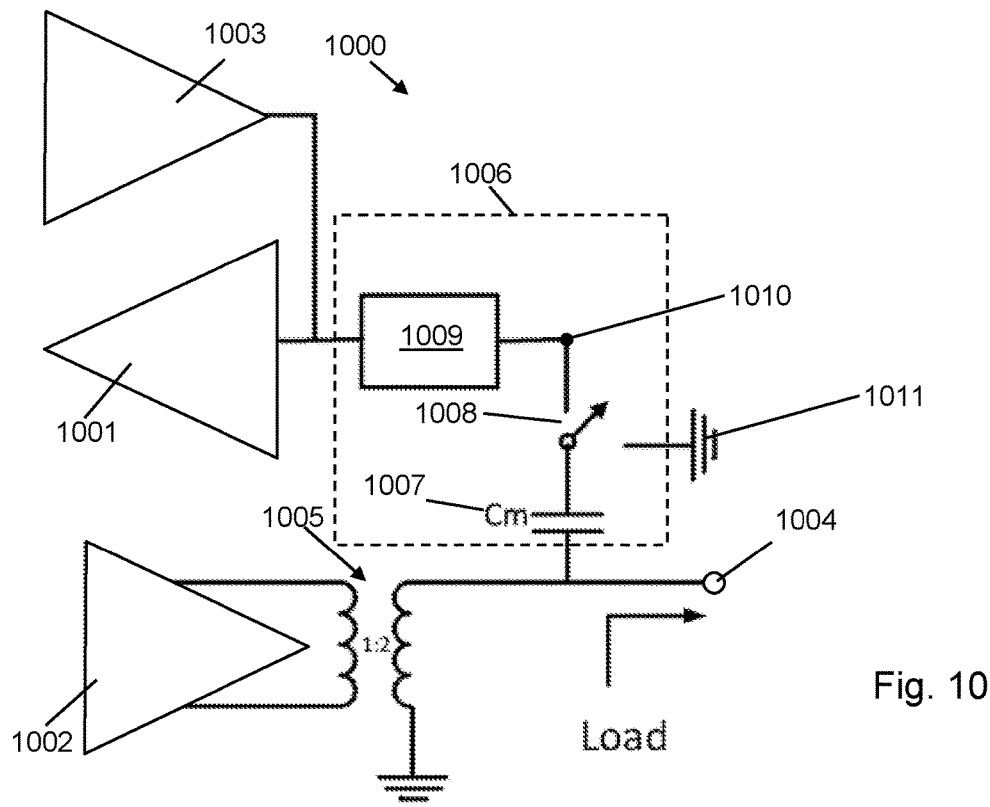
FIG. 10 illustrates an example embodiment of a multi-standard transceiver with a switching arrangement.

FIG. 10 illustrates how the transceiver 600 of FIG. 6 may be adapted to produce a multi-standard transceiver. FIG. 10 shows a transceiver 1000, comprising a first amplifier 1001, i.e. an LNA, for amplifying signals received from an antenna (not shown) via an antenna connection 1004. The LNA 1001 is operable to receive and amplify signals according to first and second different wireless communications standards, for example Bluetooth® and IEEE 802.11x (WiFi) standards.

Transceiver 1000 comprises second and third amplifiers 1002, 1003, i.e. power amplifiers, for amplifying signals to be transmitted by the antenna via the antenna connection 1004. The second amplifier 1002 is operable to amplify signals to be transmitted according to the first wireless communications standard, while the third amplifier 1003 is operable to amplify signals to be transmitted according to the second wireless communications standard.

A transformer 1005 is connected between an output of the second amplifier 1002 and the antenna connection 1004. In this example, the transformer 1005 is a balun (i.e. a balance to unbalance transformer) that transforms a differential output of the PA 1002 to a single-ended output for the antenna load.

The transceiver circuit 1000 further comprises a switching circuit 1006 connected between an input of the LNA 1001 and the antenna connection 1004, the switching circuit 1006 comprising a capacitor Cm 1007, a switching element 1008 and an impedance matching element 1009. The switching element 1008 is configured to connect a node 1010 between the capacitor 1007 and the impedance matching element 1009 to a signal ground 1011 when the transceiver 1000 is in a first standard transmit mode.

The transceiver 1000 provides impedance matching for both the LNA 1001 and the second amplifier 1002 and protects the input of the LNA 1001 from large swings at the output of the transmitter. The design makes it possible to realize competitive performance for low cost and furthermore provides functionality over a wide frequency range.

The switching element 1008 may be provided as a transistor working as a switch, which is arranged to short one of its terminals to signal ground 1011 in a transmit mode according to the first standard, thereby protecting the input of the LNA 1001 from large swings at the transmitter output, i.e. at the antenna connection 1004. The transistor makes the same terminal open circuit in a receive mode and in a transmit mode according to the second standard. The transformer 1005 can be realized with an on-chip or external transformer, transforming the differential output of the second amplifier 1002 to a single-ended output. The transformer 1005 also provides impedance transformation for the second amplifier 1002 to allow the second amplifier 1002 deliver high output powers to the load, i.e. an antenna connected to the antenna connection 1004.

The capacitor Cm serves to tune out the transformer 1005 in a transmit mode according to the first standard and works as a matching component in a receive mode and in a transmit mode according to the second standard. The capacitor Cm 1007 may be an integrated capacitor or an external capacitor. The impedance matching element 1009 can be realized using on-chip integrated passive and active components or by using external components providing input impedance matching for the LNA 1001.

The impedance matching element 1009 may be designed in such a way that it transforms the input impedance of the LNA 1001, as viewed from the node 1010, to an impedance which is a complex conjugate of the impedance as viewed from the node 1010 looking into the capacitor Cm 1007.

The design of the transceiver 1000 makes it possible to choose all the necessary components from integrated devices and components, which allows the overall cost of the transceiver 1000 to be reduced.

Figure 11:
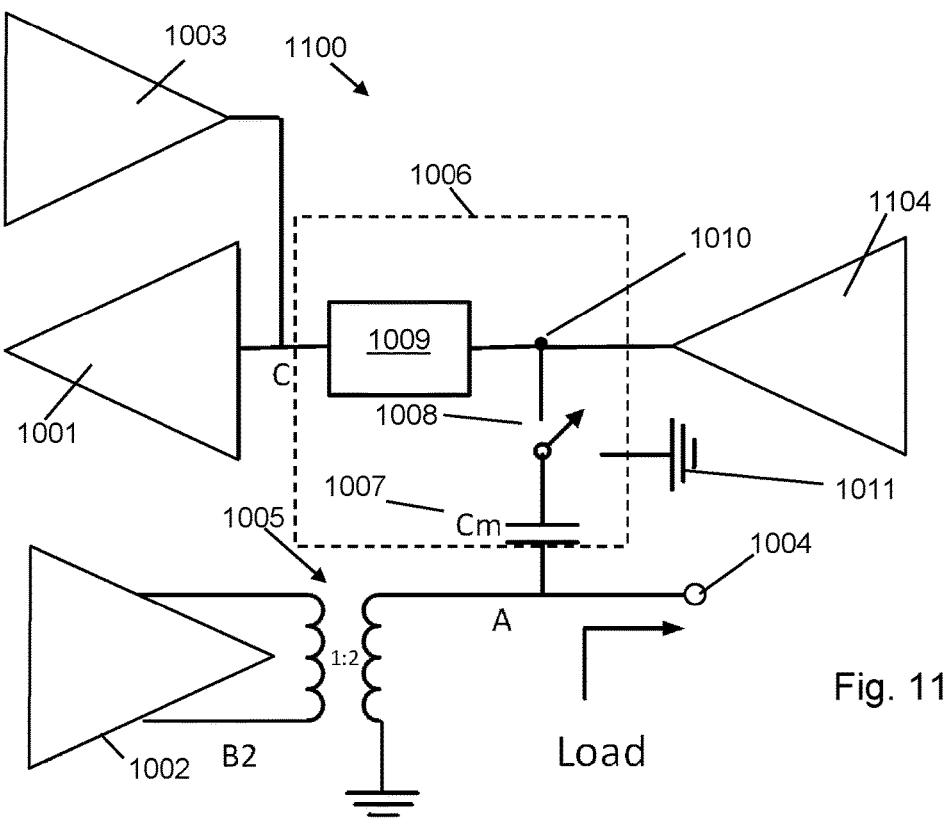
FIG. 11 illustrates an alternative example embodiment of a multi-standard transceiver with a switching arrangement.

FIG. 11 illustrates an alternative example of a multi-standard transceiver 1100. Transceiver 1100 comprises all of the features of transceiver 1000 in FIG. 10, and further comprising a fourth amplifier 1104 for amplifying signals to be transmitted by the antenna via the antenna connection 1004. An output of the fourth amplifier 1104 is connected to the node 1010. Like the third amplifier 1003, the fourth amplifier 1104 is operable to amplify signals that are to be transmitted according to the second wireless communications standard.

Figure 12:
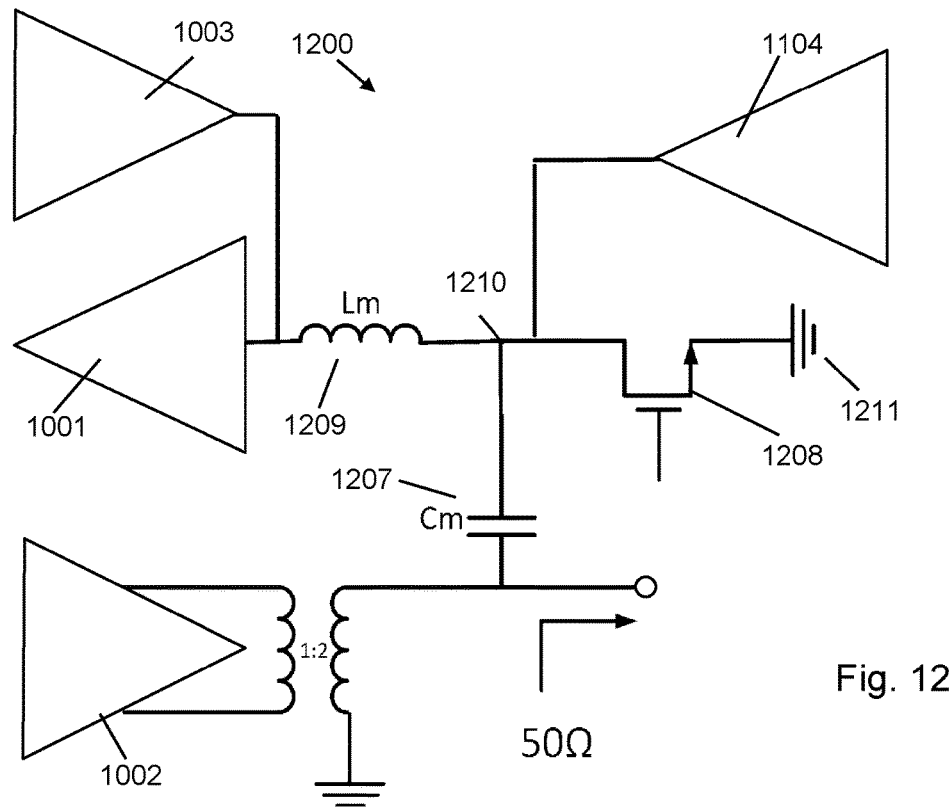
FIG. 12 illustrates a further alternative example embodiment of a multi-standard transceiver with a switching arrangement.

FIG. 12 illustrates one possible embodiment of a multi-standard transceiver 1200 using only integrated components. In this example, the impedance matching network is realized using an on-chip integrated inductor Lm 1209. The switch is realized with a CMOS transistor 1208 working as a low on-resistance switch. The switch is ON during a first standard transmit mode and grounds the connection 1210 between the inductor Lm 1209 and the capacitor Cm 1207 to signal ground 1211 when activated. During receive mode and a second standard transmit mode the transistor 1208 is OFF.

Figure 13:
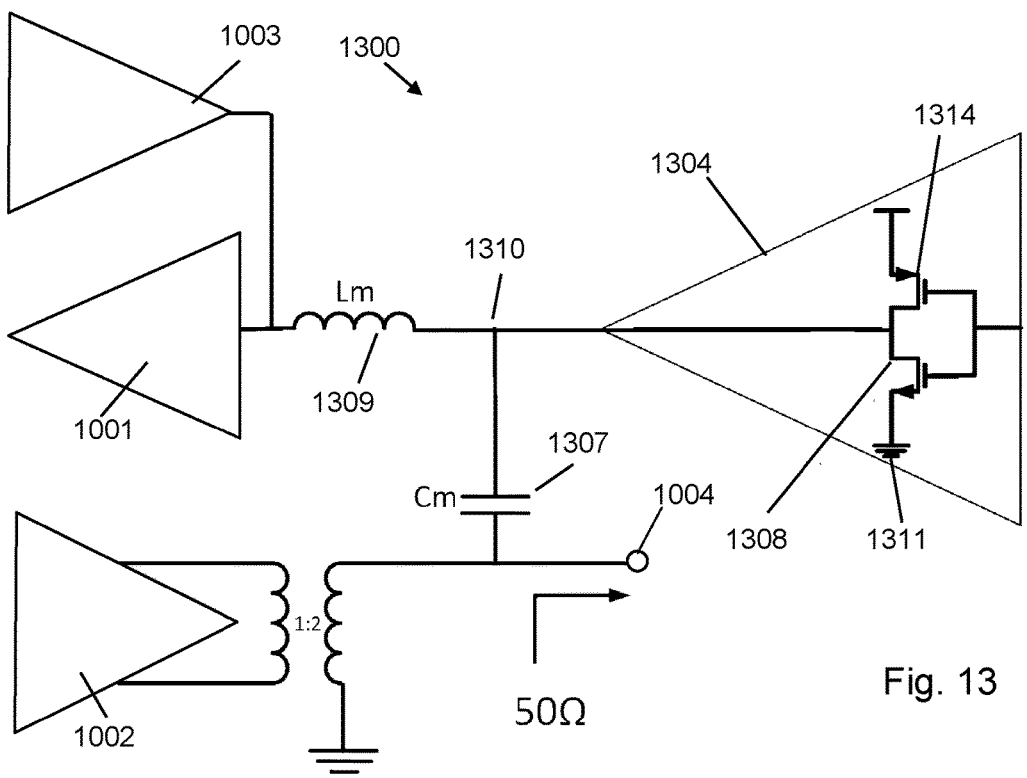
FIG. 13 illustrates a further alternative example embodiment of a multi-standard transceiver with a switching arrangement.

FIG. 13 illustrates a further possible embodiment of a transceiver 1300, which uses the fourth amplifier 1304 as the switch. In this case, the fourth amplifier 1304 is a switching amplifier, comprising at least a first transistor 1308, and a second transistor 1314. First transistor 1308 has one terminal connected to signal ground 1311 and a second terminal connected to the node 1310 between the inductor Lm 1309 and the capacitor Cm. The transistor 1308 is biased to be ON during the first standard transmit mode. Both transistors 1308 and 1314 are biased to be OFF during the receive mode, or when the third amplifier 1003 is operating.

Figure 14:
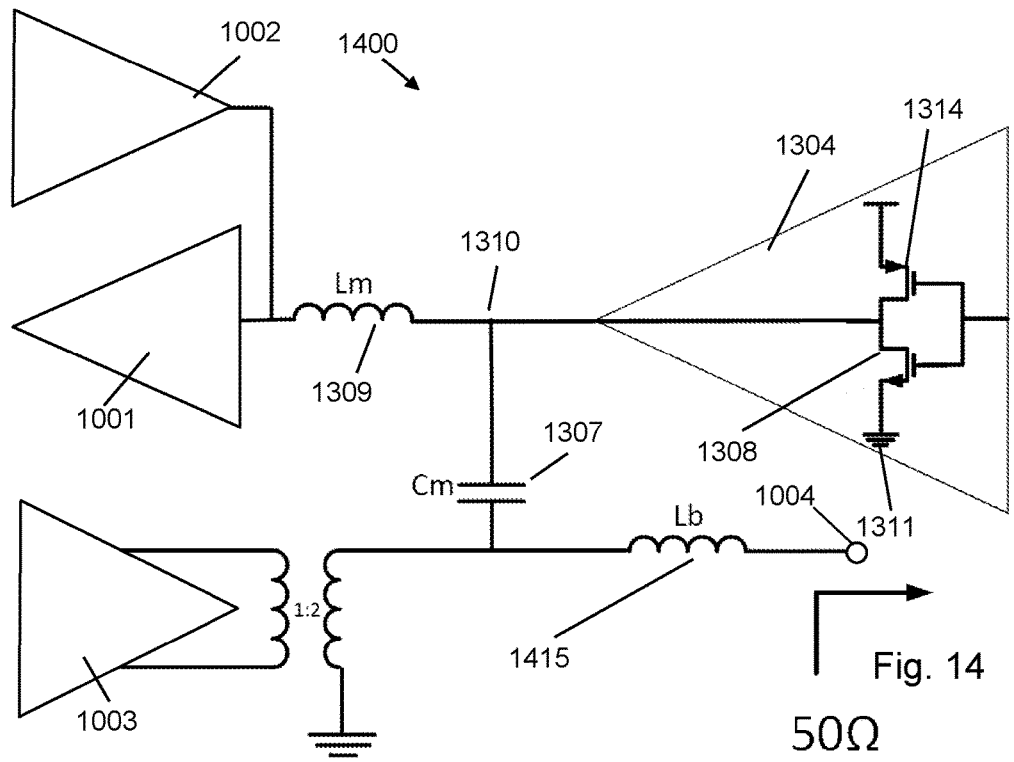
FIG. 14 illustrates a further alternative example embodiment of a multi-standard transceiver with a switching arrangement.

FIG. 14 shows an alternative embodiment of a multi-standard transceiver, with a bond wire inductance Lb 1415 connected between the capacitor 1307 and the antenna connection 1004. In this example, only the values for Cm and Lm are different from the transceiver 1300 shown in FIG. 13. In this example the LNA 1001 is impedance matched to a 50Ω antenna and the load for the second amplifier 1002 is also a 50Ω antenna. The bond wire inductance 1415 may be connected between the capacitor 1307 and the antenna connection 1004 in any other embodiment of a multi-standard transceiver according to the present disclosure.

Figure 15:
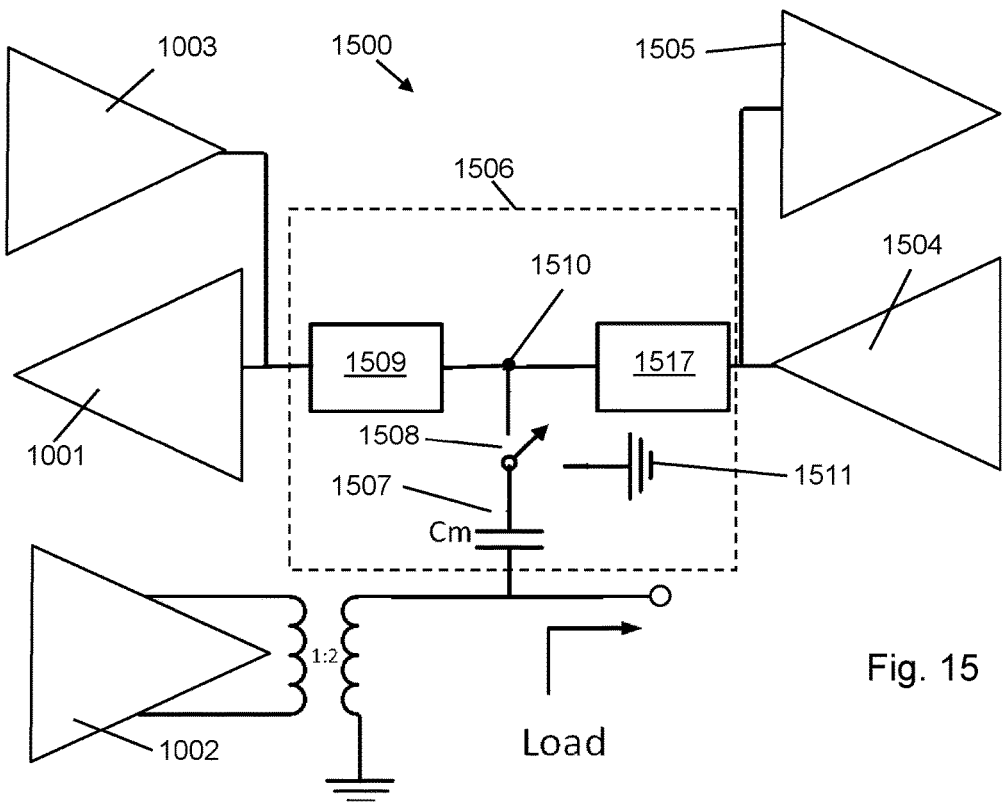
FIG. 15 illustrates a further alternative example embodiment of a multi-standard transceiver with a switching arrangement.

FIG. 15 illustrates an alternative embodiment of a multi-standard transceiver 1500. In this example, an additional LNA 1505 is connected to the node 1510 through an additional impedance matching element 1517. Additional impedance matching element 1517 forms part of a switching circuit 1506, which also comprises impedance matching element 1509, capacitor 1507 and switching element 1508. Fourth amplifier 1504 is also connected to node 1510 through the additional impedance matching element 1517. Additional impedance matching element 1517 may, for example, be an integrated component, such as an inductor. Additional impedance matching element 1517 may be designed in such a way that it transforms the input impedance of the additional LNA 1505, as viewed from the node 1510, to an impedance which is a complex conjugate of the impedance as viewed from the node 1510 looking into the capacitor Cm 1507.

In the embodiment illustrated in FIG. 15, both LNAs 1001 and 1505 may be operable to amplify received signals that are in accordance with either a first wireless communications standard or a second wireless communications standard. Alternatively, LNA 1001 may be operable to amplify signals in accordance with a first wireless communications standard, and LNA 1505 may be operable to amplify signals in accordance with a second wireless communications standard.

In a general aspect, the multi-standard radio transceivers described above enable RF transceivers to operate on only one pin, hence reducing the cost. The transceivers provide impedance matching for both LNA and Power Amplifier (PA) of different standards and protect the input of the LNA from large swings at the output of the transmitter. The designs make it possible to realize competitive performance for low cost and furthermore provide functionality for a wide range of transmitted output power.

Embodiments of transceivers described herein may be implemented for example in MOS technologies, but are not restricted to such technologies. A bipolar and Bi-CMOS version will also provide good performance. The main requirement is to design a low ON-resistance switch using available devices in the process.

From reading the present disclosure, other variations and modifications will be apparent to the skilled person. Such variations and modifications may involve equivalent and other features which are already known in the art of radio transceivers, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality and reference signs in the claims shall not be construed as limiting the scope of the claims.

The invention claimed is:

1. A radio transceiver circuit comprising:
a first amplifier for amplifying signals received from an antenna via an antenna connection;
a second amplifier for amplifying signals to be transmitted by the antenna via the antenna connection, wherein the second amplifier is operable to amplify signals to be transmitted according to a first wireless communications standard, and further comprising a third amplifier operable to amplify signals to be transmitted according to a second wireless communications standard by the antenna via the antenna connection; and
a switching circuit connected between an input of the first amplifier and the antenna connection, the switching circuit comprising a capacitive circuit including a capacitor, a switching element and an impedance matching element that is configured to connect a node between the capacitor and the impedance matching element to a signal ground when the transceiver is in a transmit mode, wherein the switching element and the impedance matching element are configured and arranged to transform an input impedance of the first amplifier to an impedance, looking into the impedance matching circuit from the node, when the transceiver is in a transmit mode and based on whether the second amplifier or the third amplifier is operable to amplify signals to be transmitted in accordance with the first wireless communications standard or the second wireless communications standard.

2. The radio transceiver circuit of claim 1 comprising a transformer connected between an output of the second amplifier and the antenna connection, wherein the first wireless communications standard and the second wireless communications standard correspond to a wireless communications standard which provides wireless access to the internet and to another wireless communications standard which provides wireless connectivity over a wireless communications range that is less than a range over which the first wireless communications standard provides communications.

3. The radio transceiver circuit of claim 2 wherein the transformer is a balance to unbalance transformer.

4. The radio transceiver circuit of claim 1, wherein the impedance matching element includes or is an inductor and the switching element includes a transistor.

5. The radio transceiver circuit of claim 1, comprising a bond wire inductance connected between the switching circuit and the antenna connection.

6. The radio transceiver circuit of claim 1, wherein the switching element is a transistor connected between the impedance matching element and the signal ground to provide a short therebetween when activated.

7. The radio transceiver circuit of claim 1, wherein the first or second wireless communications standard is consistent with a Bluetooth® standard or an IEEE 802.11x standard.

8. An integrated circuit comprising a radio transceiver circuit according to claim 1.

9. A radio transceiver circuit comprising:
a first amplifier for amplifying signals received from an antenna via an antenna connection;
a second amplifier for amplifying signals to be transmitted by the antenna via the antenna connection; and
a switching circuit connected between an input of the first amplifier and the antenna connection, the switching circuit comprising a capacitive circuit including a capacitor, a switching element and an impedance matching element that is configured to connect a node between the capacitor and the impedance matching element to a signal ground when the transceiver is in a transmit mode, wherein the impedance matching element transforms an input impedance of the first amplifier to an impedance looking into the impedance matching circuit from the node that is a complex conjugate of an impedance looking into a capacitive circuit having the capacitor from the node.

10. A radio transceiver circuit comprising:
a first amplifier configured and arranged to amplify signals received from an antenna via an antenna connection;
a second amplifier configured and arranged to amplify signals to be transmitted by the antenna via the antenna connection and to amplify signals to be transmitted according to a first wireless communications standard;
a switching circuit connected between an input of the first amplifier and the antenna connection, the switching circuit comprising a capacitor, an impedance matching element, and a switching element that is configured to connect a node between the capacitor and the impedance matching element to a signal ground when the transceiver is in a transmit mode; and
a third amplifier configured and arranged to amplify signals to be transmitted according to a second wireless communications standard by the antenna via the antenna connection, wherein an output of the third amplifier is connected between the impedance matching element and the input of the first receiving amplifier.

11. A radio transceiver circuit comprising:
a first amplifier for amplifying signals received from an antenna via an antenna connection;
a second amplifier for amplifying signals to be transmitted according to a first wireless communications standard by the antenna via the antenna connection
a third amplifier for amplifying signals to be transmitted according to a second wireless communications standard by the antenna via the antenna connection;
a switching circuit connected between an input of the first amplifier and the antenna connection, the switching circuit comprising a capacitor, a switching element and an impedance matching element;
wherein the switching element is configured to connect a node between the capacitor and the impedance matching element to a signal ground when the transceiver is in a transmit mode; and
a fourth amplifier operable to amplify signals to be transmitted according to the second wireless communications standard by the antenna via the antenna connection, wherein an output of the fourth amplifier is connected to the node between the impedance matching element and the capacitor.

12. The radio transceiver circuit of claim 11, wherein the fourth amplifier is a switching power amplifier comprising first and second transistors, the first transistor connected between the node and signal ground to provide a short therebetween when activated.

13. The radio transceiver circuit of claim 11, further comprising a fifth amplifier for amplifying signals received from the antenna via the antenna connection, a second impedance matching element connected between the node and an input of the fifth amplifier.

14. The radio transceiver circuit of claim 13, wherein the capacitor is at least a part of a capacitive circuit, and wherein the second impedance matching element transforms an input impedance of the fifth amplifier to an impedance looking into the impedance matching element from the node that is a complex conjugate of an impedance looking into the capacitive circuit from the node.

15. A radio transceiver circuit comprising:
a first amplifier for amplifying signals received from an antenna via an antenna connection;
a second amplifier for amplifying signals to be transmitted by the antenna via the antenna connection;
a switching circuit connected between an input of the first amplifier and the antenna connection, the switching circuit comprising a capacitor, a switching element and an impedance matching element;
wherein the switching element is configured to connect a node between the capacitor and the impedance matching element to a signal ground when the transceiver is in a transmit mode;
wherein the impedance matching element transforms an input impedance of the first amplifier to an impedance looking into the impedance matching circuit from the node that is a complex conjugate of an impedance looking into the capacitor from the node; and
wherein the second amplifier is operable to amplify signals to be transmitted according to a first wireless communications standard, and further comprising a third amplifier operable to amplify signals to be transmitted according to a second wireless communications standard by the antenna via the antenna connection.

16. The radio transceiver circuit of claim 15, further comprising a fourth amplifier operable to amplify signals to be transmitted according to the second wireless communications standard by the antenna via the antenna connection, wherein an output of the fourth amplifier is connected to a node between the impedance matching element and the capacitor.

17. The radio transceiver circuit of claim 15, further comprising a fifth amplifier for amplifying signals received from the antenna via the antenna connection, a second impedance matching element connected between the node and an input of the fifth amplifier.

18. The radio transceiver circuit of claim 17, wherein the second impedance matching element transforms an input impedance of the fifth amplifier to an impedance looking into the impedance matching element from the node that is a complex conjugate of an impedance looking into the capacitor from the node.

19. A method for using a radio transceiver circuit, the method comprising:
amplifying signals, through a first amplifier, received from an antenna via an antenna connection;

amplifying signals, through a second amplifier or through a third amplifier, to be transmitted respectively according to a first wireless communications standard or a second wireless communications standard by the antenna via the antenna connection; and providing a switching circuit connected between an input of the first amplifier and the antenna connection, the switching circuit comprising a capacitive circuit having a capacitor, a switching element and an impedance matching element, and controlling the switching element to connect a node between the capacitor and the impedance matching element to a signal ground when the transceiver is in a transmit mode, wherein the switching element and the impedance matching element are configured and arranged to transform an input impedance of the first amplifier to an impedance, looking into the impedance matching circuit from the node, when the transceiver is in a transmit mode and based on whether the second amplifier or third amplifier is operable to amplify signals to be transmitted, the first wireless communications standard being different than the second wireless communications standard based at least on range of wireless connectivity.

\* \* \* \* \*